Dec. 28, 1926.                                       1,612,095
J. BROWN
APPARATUS FOR THE MANUFACTURE OF CEMENT TILE
Filed Sept. 30, 1925        11 Sheets-Sheet 1
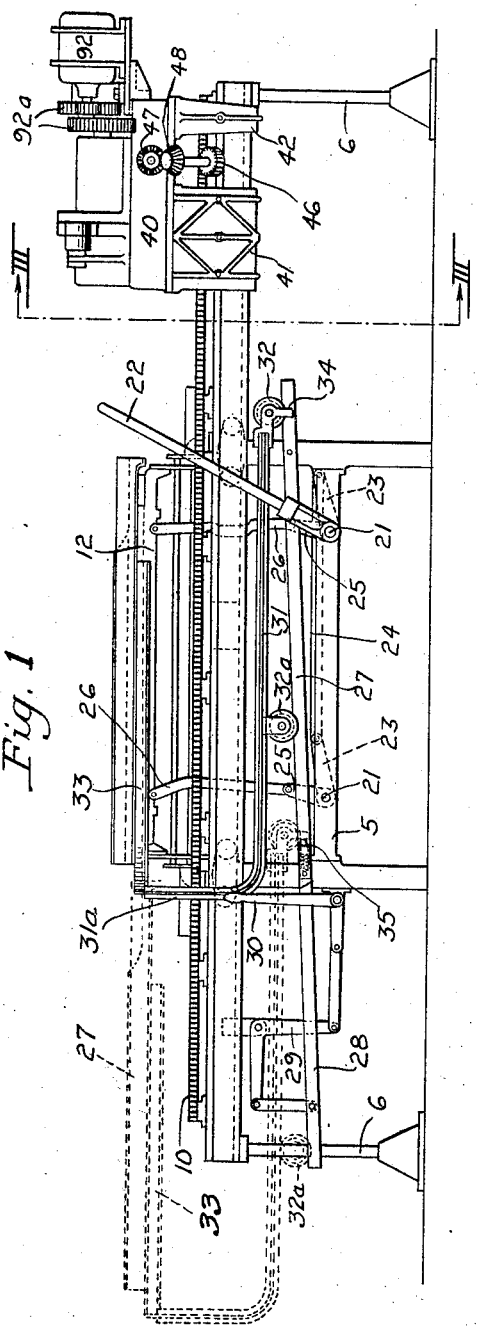
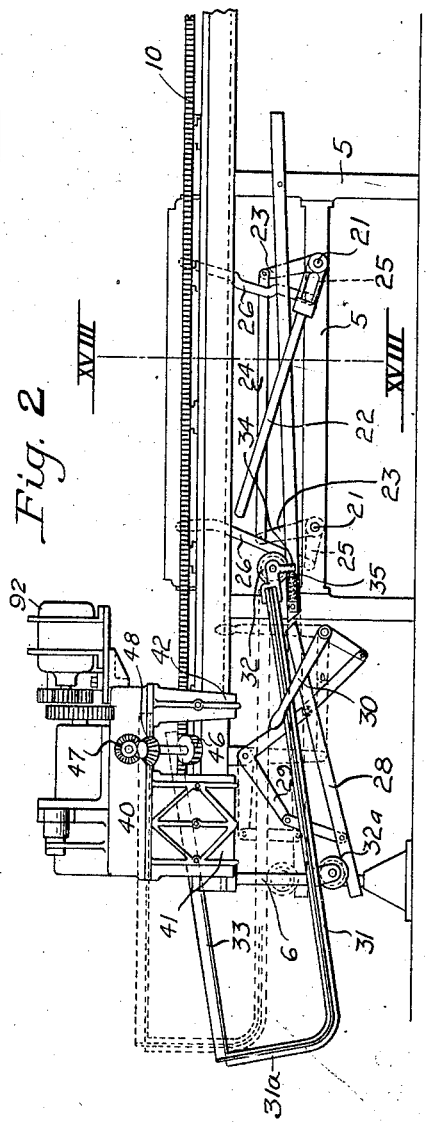
INVENTOR
James Brown Dec. 28, 1926.  
J. BROWN  
1,612,095  
APPARATUS FOR THE MANUFACTURE OF CEMENT TILE  
Filed Sept. 30, 1925    11 Sheets-Sheet 2

INVENTOR

Dec. 28, 1926.
J. BROWN
1,612,095
APPARATUS FOR THE MANUFACTURE OF CEMENT TILE
Filed Sept. 30, 1925
11 Sheets-Sheet 3

INVENTOR
James Brown
by Byrnes Stebbins & Parmelee
his attorneys

Dec. 28, 1926.  
J. BROWN  
1,612,095  
APPARATUS FOR THE MANUFACTURE OF CEMENT TILE  
Filed Sept. 30, 1925　11 Sheets-Sheet 4

INVENTOR  
James Brown  
by Byrnes Stebbins & Parmelee  
his attorneys

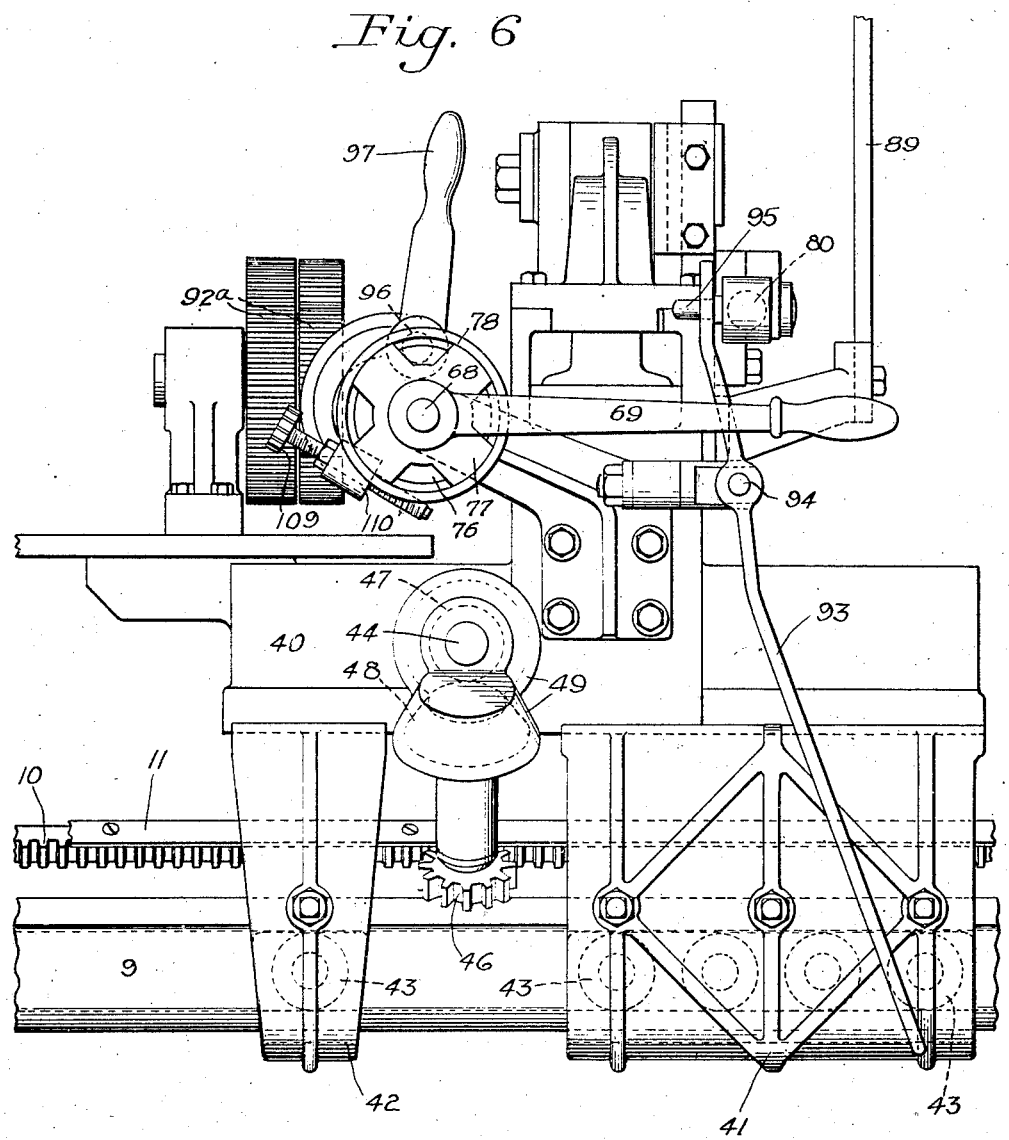

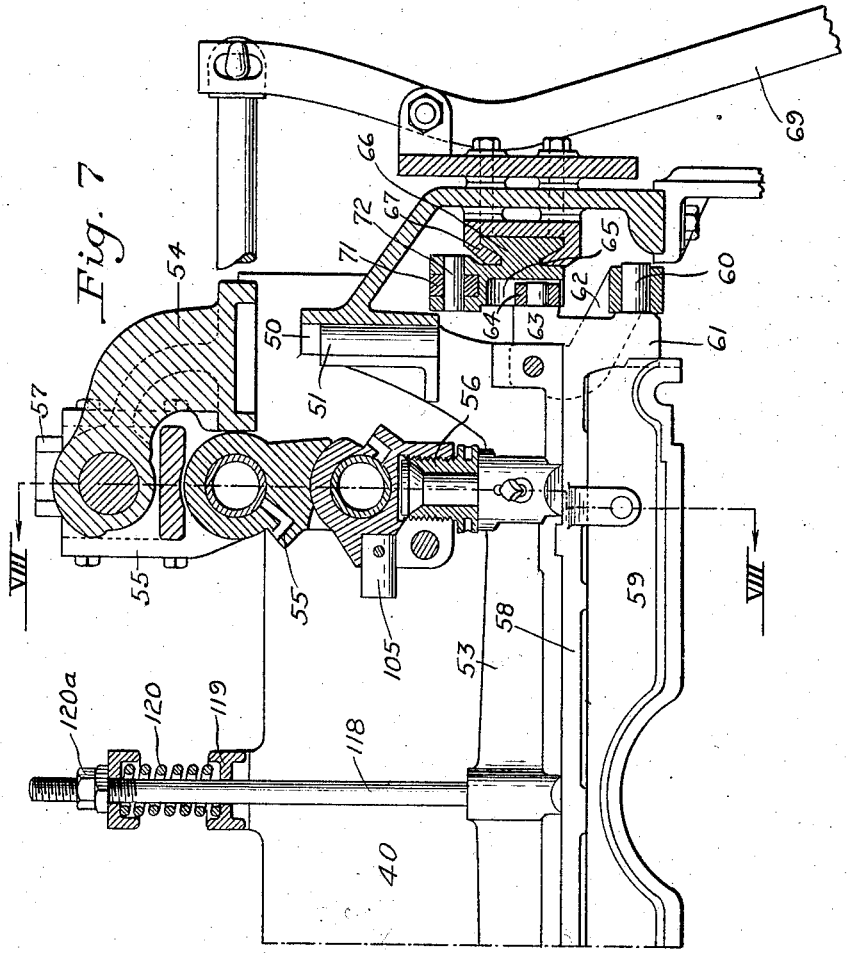
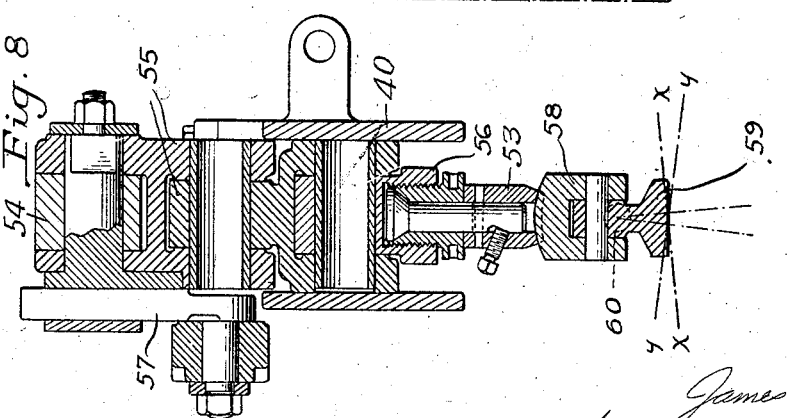

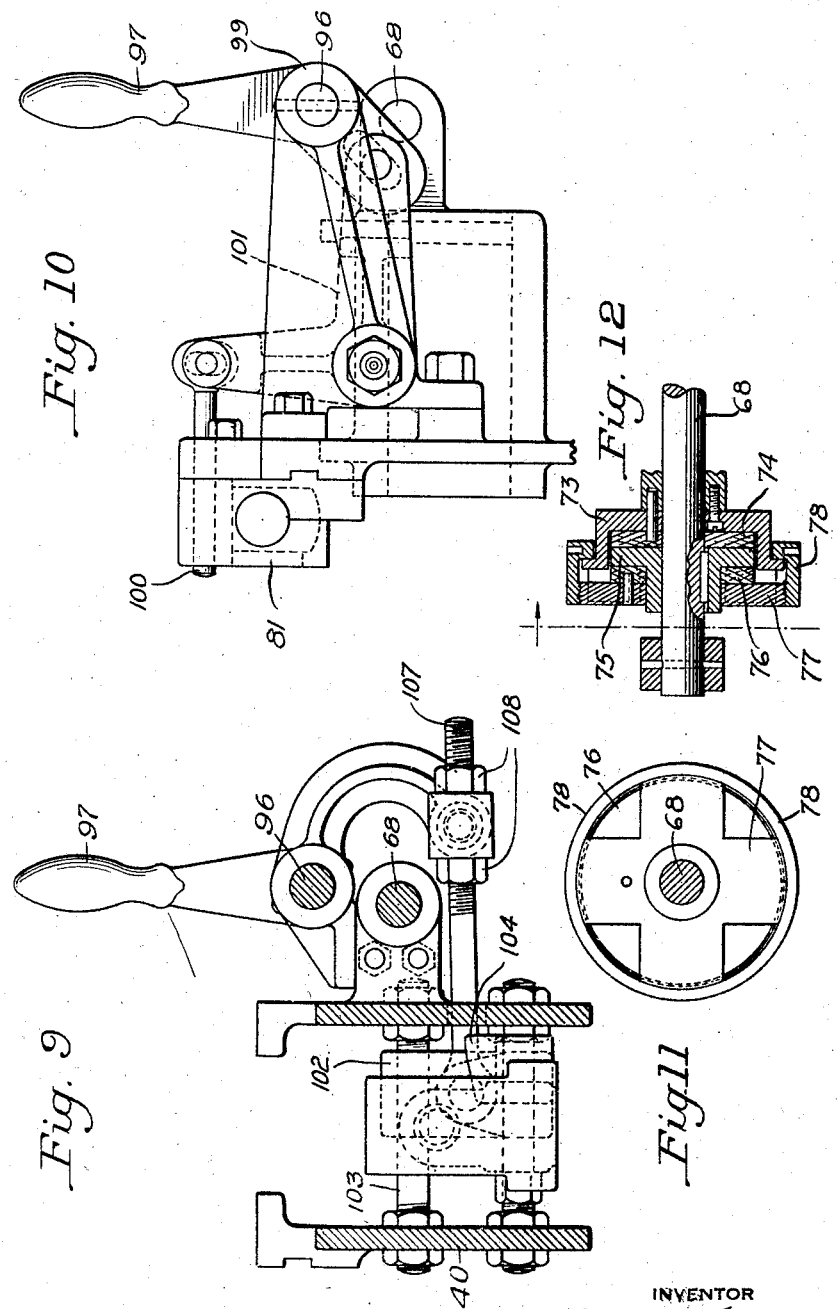

Dec. 28, 1926.  1,612,095
J. BROWN
APPARATUS FOR THE MANUFACTURE OF CEMENT TILE
Filed Sept. 30, 1925     11 Sheets-Sheet 8
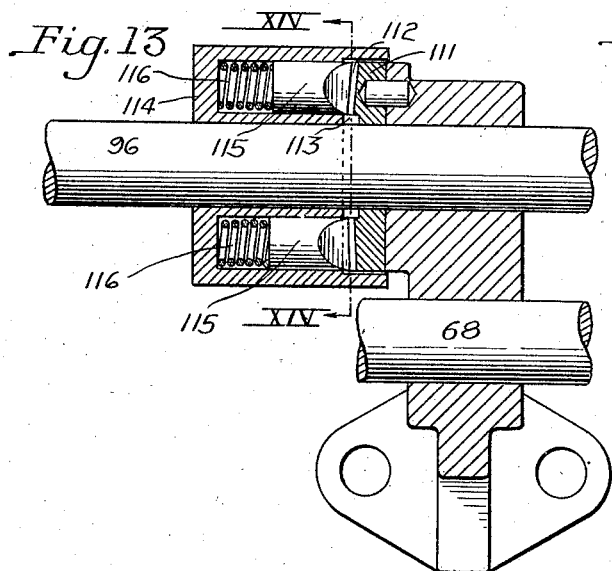
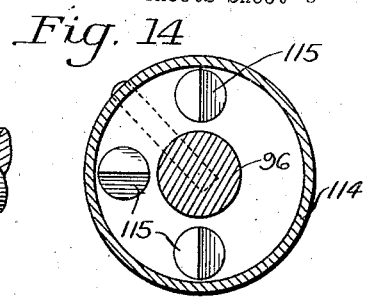
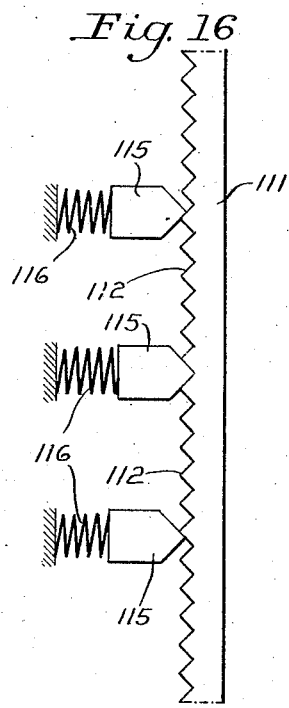
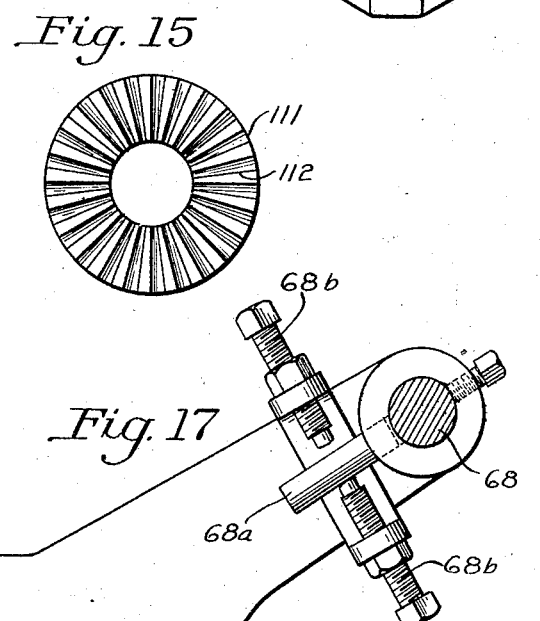
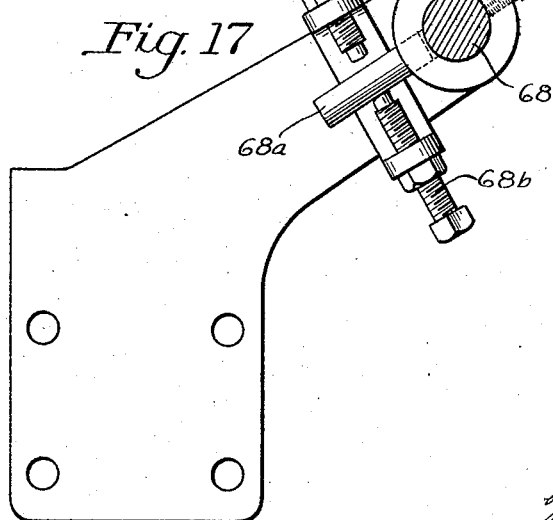
INVENTOR
James Brown
by Byrnes, Stebbins & Varnum
his attorneys Dec. 28, 1926.
J. BROWN
1,612,095
APPARATUS FOR THE MANUFACTURE OF CEMENT TILE
Filed Sept. 30, 1925    11 Sheets-Sheet 9
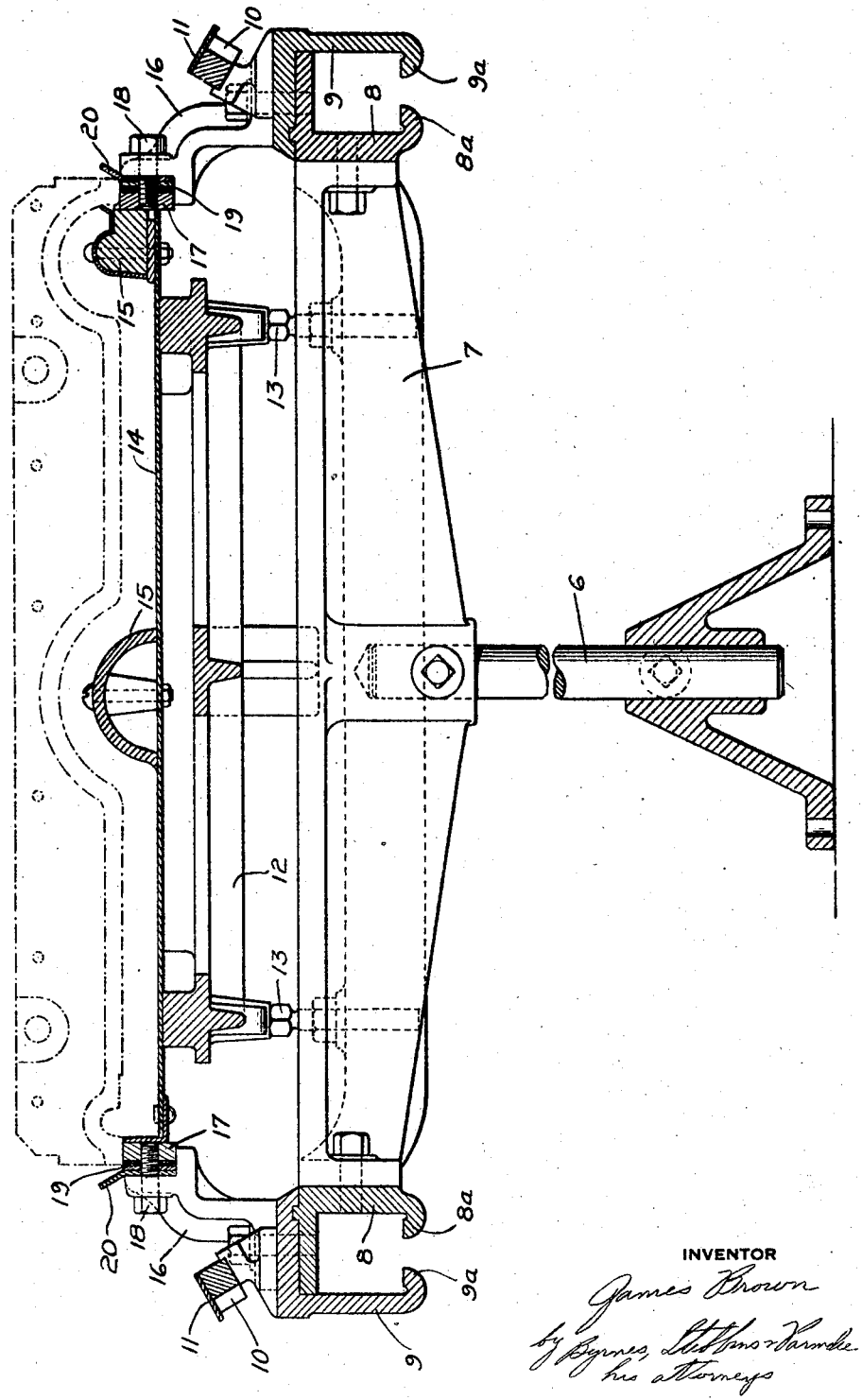
INVENTOR Dec. 28, 1926. 1,612,095
J. BROWN
APPARATUS FOR THE MANUFACTURE OF CEMENT TILE
Filed Sept. 30, 1925 11 Sheets-Sheet 10
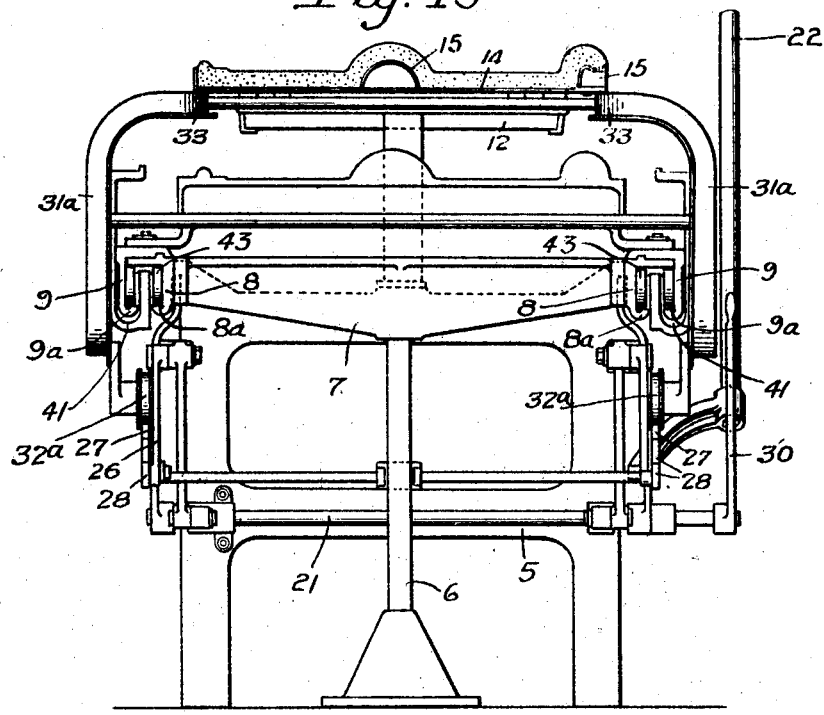
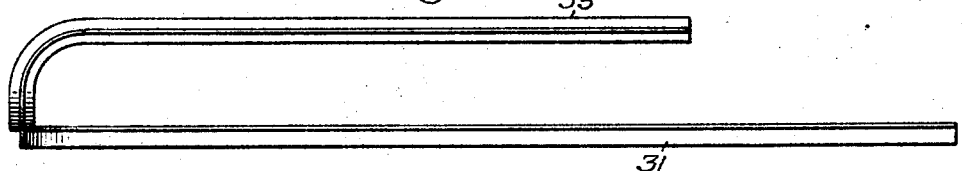
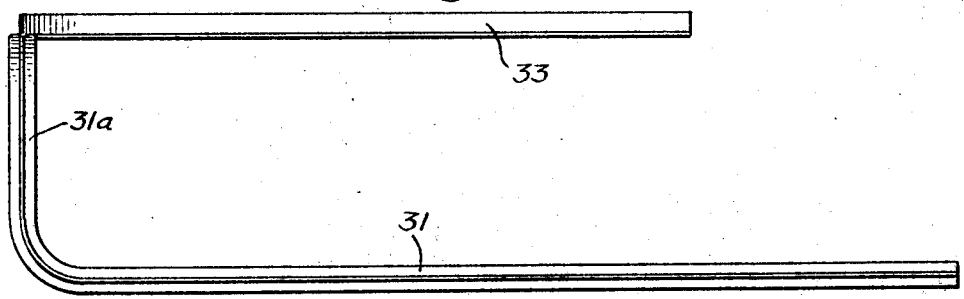
INVENTOR
James Brown
by Byrnes, Stebbins & Parmelee
his attorneys

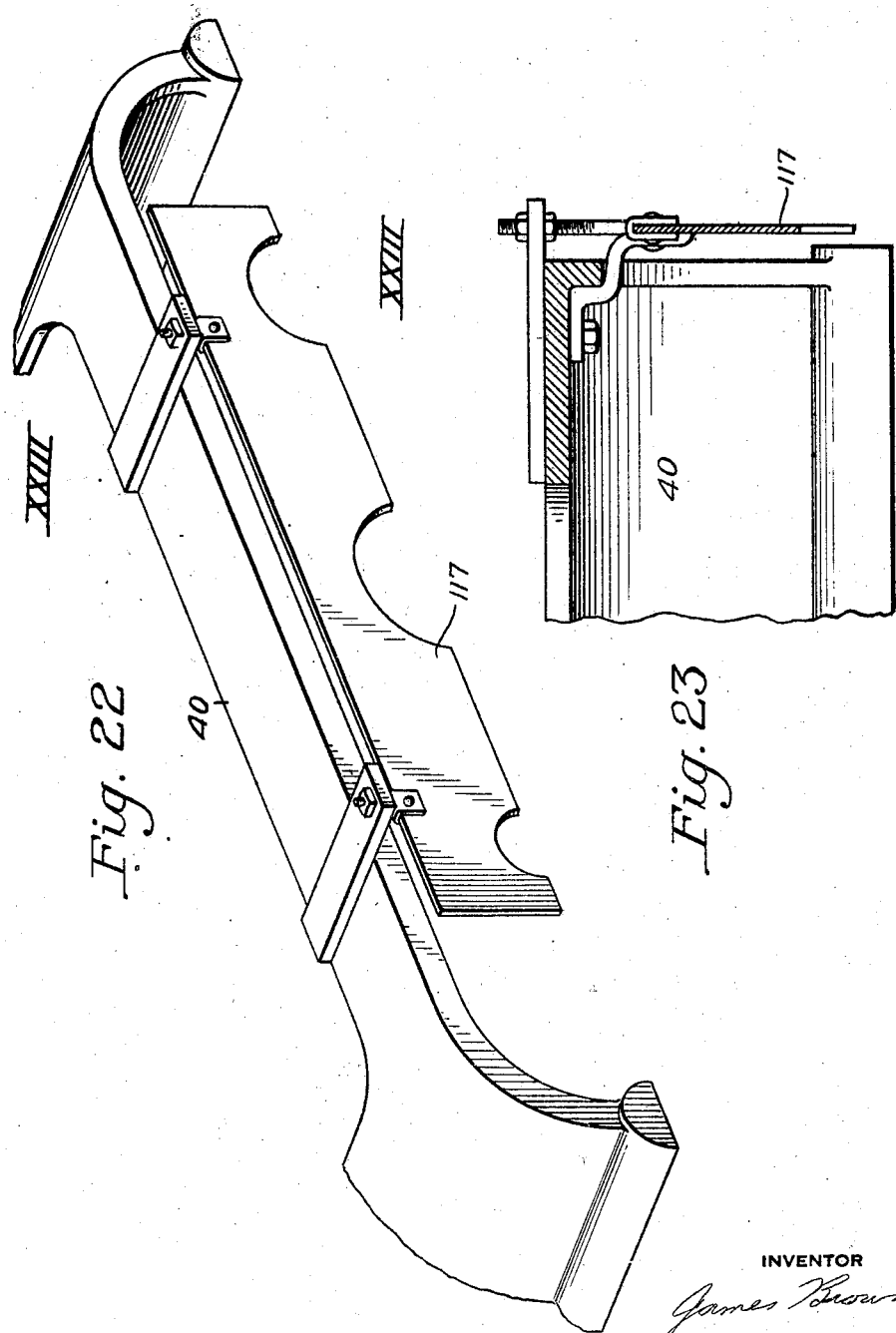

Patented Dec. 28, 1926.

1,612,095

UNITED STATES PATENT OFFICE.

JAMES BROWN, OF NEW CASTLE, PENNSYLVANIA, ASSIGNOR TO AMERICAN CEMENT TILE MANUFACTURING COMPANY, OF PITTSBURGH, PENNSYLVANIA, A CORPORATION OF PENNSYLVANIA.

APPARATUS FOR THE MANUFACTURE OF CEMENT TILE.

Application filed September 30, 1925. Serial No. 59,551.

This invention relates to the manufacture of earthen blocks or tiles, and particularly to the manufacture of cement roofing tiles, slabs, and the like.

According to the usual practice of manufacturing roofing tiles and slabs and the like, the pallet of suitable form is set on a work table, after which a cement mixture containing only a very small amount of water is heaped onto the pallet, a reinforcement being put on the pallet at the proper time when such is desirable. After packing the material in a proper fashion with a block, the workman passes a suitable forming bar over the pallet, scraping away excess material. Then with his forming bar, which has a relatively small surface area, he tamps the mixture into form. Obviously, such tamping is not uniform and is very laborious, time consuming and requires considerable skill.

After having tamped the tile sufficiently, the workman goes over the surface of the block with a hand trowel, smoothing it off, touching it up, filling in material where needed and removing it where necessary.

If the tile is to be colored, pigment is then sprinkled over the block, together with cement, the pigment wet with water, and then the workman works the surface of the block with a trowel to spread the pigment.

According to the present invention, it is proposed to provide a machine for forming, tamping and troweling the tiles, which will produce tiles of greater uniformity, better quality, and with considerable more speed than is possible with the present practice.

A further object of the invention is to provide improved means for handling the tiles or slabs upon their completion to facilitate the removal thereof from the machine.

The invention may be readily understood by reference to the accompanying drawings illustrative of a practical embodiment of my invention, but to the construction of which the invention is not limited.

In the drawings:

Figure 1 is a side elevation of the assembled machine, with the forming head retracted, and the pallet elevated;

Figure 2 is a similar view showing the pallet lowered and the forming head moved to the other end of the machine;

Figure 6 is a side elevation of the forming head;

Figure 7 is a detail sectional view through a part of the forming head, this section being substantially a vertical section on the line VII—VII of Figure 4;

Figure 8 is a detail section through the tamping bar on the line VIII—VIII of Figure 7;

Figure 9 is a detail view of the adjusting mechanism for the profile or tamping bar, representing a section on the line IX—IX of Figure 4;

Figure 10 is a detail of the lever holding mechanism;

Figures 11 and 12 are detail views of the friction holding means for one of the operating shafts of the device;

Figures 13, 14 and 15 are details of a detent mechanism for restraining one of the other operating shafts against movement;

Figure 16 is a developed view of the detents and teeth of the mechanism shown in Figures 13 to 15, inclusive;

Figure 17 is a detail view of an adjustable limiting stop for the shaft for tilting the profile bar;

Figure 18 illustrates a transverse section through the bed of the machine and pallet in substantially the plane of line XVIII—XVIII of Figure 2, the pallet elevating mechanism and removal carriage being omitted;

Figure 19 is an end view from the left hand end of Figure 1, showing the pallet support dropped, and the pallet on the pallet lowering frame;

Figues 20 and 21 show views of the pallet lowering frame apart from other portions of the machine;

Figure 22 is a perspective view of the striker bar for removing excess material; and Figure 23 is a section in the plane of line XXIII—XXIII of Figure 22 showing the manner of mounting the striker bar.

Figure 5:
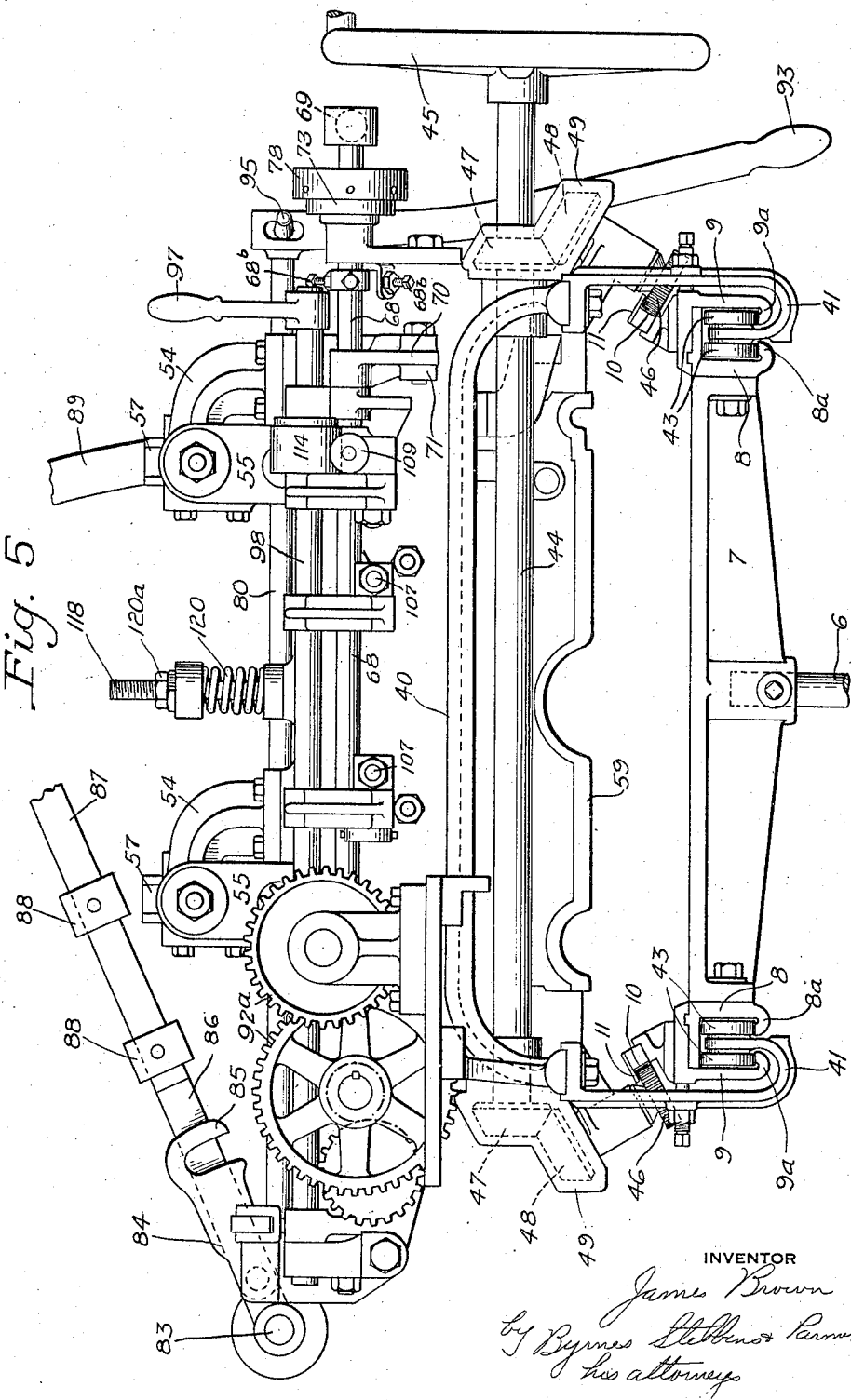
Figure 5 is an end view of the forming head, showing the end opposite that shown in Figure 3.

Referring to the drawings, 5 designates a suitable supporting frame and 6 are supplemental end supports. The frame 5 includes upper spreaders 7 which support an inverted angular guide track 8 having a lip $8^a$ extending therealong, as shown in Figures 5 and 18. Resting on the top flange of the angle track 8 is a substantially similar but reversed angle bar 9 having a lip $9^a$ thereon. The longitudinally extending lips $8^a$ and $9^a$ are turned toward each other and are spaced apart. This provides an enclosed guideway at each side of the machine for the purpose hereinafter described.

Extending along the top of each guideway is a rack 10 which is preferably inclined transversely, as shown. The teeth of the racks may be protected by guard plates 11.

Set in the frame, preferably near the center of its length, is the pallet receiving platform 12. (See Figure 18). Bolts 13 in the frame of the machine provide a rest for the platform in the frame. By adjusting bolts 13 vertically the downward or lowermost limit of movement for the platform may be varied.

The pallet, which is removably set on the platform, is designated 14 and may have suitable cores 15 thereon for producing ribs or beads or the like in the tile. Mounted on the top of the frame are brackets 16 that support positioning strips 17 between which the pallet is received and confined. Bolts 18 may be utilized to hold strips 17 in place, and 19 designates fillers by means of which the machine may be accommodated to the molding of blocks on pallets of different sizes and forms. A flared flanged strip 20 may be provided back of strips 17 to assist in retaining the cement mixture before it is packed in the pallet.

The platform 12 is preferably arranged to be raised and lowered at will. For this purpose a pair of transverse shafts 21 are mounted in the frame below the platform. One shaft has an operating lever or crank 22 secured thereto. Each of the shafts 21 has a crank arm 23, as shown in Figures 1 and 2, attached thereto, these arms being connected by a link 24. When lever 22 is operated, both cranks rotate by reason of this connection. Each of the shafts 21 also carry arms or cranks 25. To these arms are connected toggle links 26 whose upper ends pivotally connect with the platform 12. Operation of lever 22 from the position shown in Figure 2 to the position shown in Figure 1, raises the platform 12. When platform 12 lifts, it lifts the pallet 14 supported thereon. If there is a molded slab on the pallet, the slab, of course, would remain on the pallet. When the platform is elevated, the cranks 25 are past dead center and shafts 21 can rotate no further, so that the platform will remain in elevated position.

It may be noted here that after a slab or tile has been formed, the platform and pallet will be raised and the pallet with its block lifted off the platform. The pallet is then set aside while the block setting thereon hardens. A new pallet is then set on the platform and lowered to the lowermost position in the machine.

To facilitate the removal of pallets having tiles thereon, a transfer mechanism may be provided. This mechanism, which forms a part of the present invention, may now be explained. Inclined rails 27 are provided in the machine, and at the lower ends of these rails are movable extensions 28. These extensions may be aligned with rails 27, as shown in Figure 1, or tilted down to the position shown in Figure 2, by the operation of a system of levers including bell crank 29 and operating lever 30, as will be readily understood.

Mounted for movement on the rails 27 and 28 is a cradle 31 having rollers 32 and $32^a$ on the lower part thereof that engage rails 27 and 28. The forward rollers 32 never leave the rails 27. At the rear of the lower part of the cradle 31 is an upright $31^a$ supporting a forwardly projecting overhanging extension 33.

As the cradle is pushed forwardly from the dotted line position of Figure 1 to the full line position, the extension 33 shoves under the elevated pallet, outside of the platform 12, the extension rising vertically by reason of the inclination of the track 27. At its forwardmost position, the extension 33 is just under the elevated platform. By rocking lever 22 to a slight extent to lower the platform 12, the pallet may be dropped until it rests on the extension 33. The cradle may then gravitate down tracks 27 and 28 to the dotted line position of Figure 1, whereupon the pallet can be readily removed or transferred to conveying mechanism. Track section 28 may be dropped to get the cradle out of the way of the working head of the machine, and to facilitate the removal of the pallet.

A lug 34 adjacent roller 32 may be provided for contact with a yieldable cushion 35 near the lowermost end of track 27, as best shown in Figure 2, for limiting the travel of the cradle.

The construction and operation of the tile forming mechanism per se may now be described. In general, it includes a carriage or working head mounted for travel along the machine having a cross bar therein shaped to produce a surface of the desired shape on the upper face of the slab, and referred to as a profile bar. This bar may be rapidly raised and lowered to tamp the material on the pallet, or it may be inclined transversely at a fixed elevation so as to function as a smoothing trowel as the carriage travels along the machine.

The carriage or working head of the machine includes a carriage frame 40, on the underside of which are hangers 41 and 42. There is a wide hanger 41 at each side of the frame and a narrow hanger 42. On these hangers are rollers 43 which are received in the guideways formed by side rails 8 and 9. The ledges 8ª and 9ª support the rollers, which are sufficiently large to prevent any considerable upward lifting of the carriage. The arrangement is also one where the tracks are protected from sand or cement, the tracks being covered so that sand or cement cannot fall thereon.

Extending across the carriage and in suitable bearings therein is a shaft 44 having a hand wheel 45 thereon. This shaft drives a gear wheel 46 meshing with rack 10 at each side of the machine through bevel gears 47 and 48 in housings 49. By operation of the hand wheel the carriage may be rapidly or slowly moved along the machine.

In the carriage frame at each side thereof are vertical guideways 50 in which are sliding shoes 51, as shown in Figure 7, of a vertically reciprocable cross head 53, which is suspended from brackets 54 on the carriage through a system of toggle levers 55 and adjuster 56. A crank 57 at the top of each system of toggles provides an operating element therefor. When cranks 57 are oscillated through a limited arc, the toggles function in a manner well understood by reference to the accompanying drawing, to raise and lower the cross head.

Hung from the cross head 53 is a cross bar 58 which is longitudinally grooved to receive the interchangeable profile bar 59. By reference to Figure 8, it will be seen that the bar 58 has a convexed upper surface against which the concaved lower face of cross head 53 bears. This is to permit bar 58, with bar 59, to be transversely tilted on trunnions 60 carried by depending lugs 61 on bar 58 as an axis. Trunnions 60 have a bearing in brackets 62 suspended from the cross head. An upwardly projecting lug 63 on each end of the bar 58 carries a roller 64 that engages in a recess 65 in a sliding shoe 66 mounted in a guideway 67 in the carriage frame.

When shoes 66 are moved in one direction the face of the profile bar may be tilted to the plane of line X—X of Figure 8, and when they are shifted in the other direction the face of the profile bar 59 may lie in the plane of line Y—Y. The exact tilt of the profile bar may be adjusted as hereinafter described.

For moving the shoes 66 at opposite sides of the machine in unison, a shaft 68 is suitably supported in the carriage and extends thereacross. On one end of this shaft is a hand lever 69, this lever preferably being conveniently located with respect to the hand wheel. Near opposite ends of the shaft are arms or cranks 70 whose outer ends are pivotally connected with links 71. Links 71 are pivotally connected with the shoes 66 at 72. When shaft 68 is rotated a slight amount, shoes 66 are reciprocated to control the angle of profile bar 59.

In order to frictionally hold the shaft 68 in any position to which it is set by lever 69, a suitable friction device, such as that shown in Figures 11 and 12, may be used. This may include a fixed casing 73 in which is a fixed block of wood or other friction material 74. The shaft 68 passes through this disk of wood and has keyed thereto a metal disk 75 that bears against the wood. At 76 is a second disk of wood non-rotatably carried by a plate 77 threaded into a flanged sleeve 78 cooperating with casing 73. When sleeve 78 is rotated by means of a suitable spanner wrench, the wooden disks are forced into frictional engagement with disk 75, tending to thereby frictionally hold the shaft against free rotation.

This arrangement makes it possible to rotate the shaft 68 to suitably rock the profile bar, but is sufficiently stiff to hold the bar at the angle to which it is moved. The distance through which the shaft 68 may rotate is regulated by pin 68ª and adjustable stop screws 68ᵇ, as shown in Figure 17, pin 68ª being adjustably secured on the shaft.

The profile bar is set at an angle only when it is used for troweling or smoothing. When it is used for tamping, it is set to bring its full face to bear on the material in the pallet. When used for tamping, the bar is rapidly reciprocated up and down by the toggle systems 55 to which motion is transmitted by cranks 57.

Figure 3:
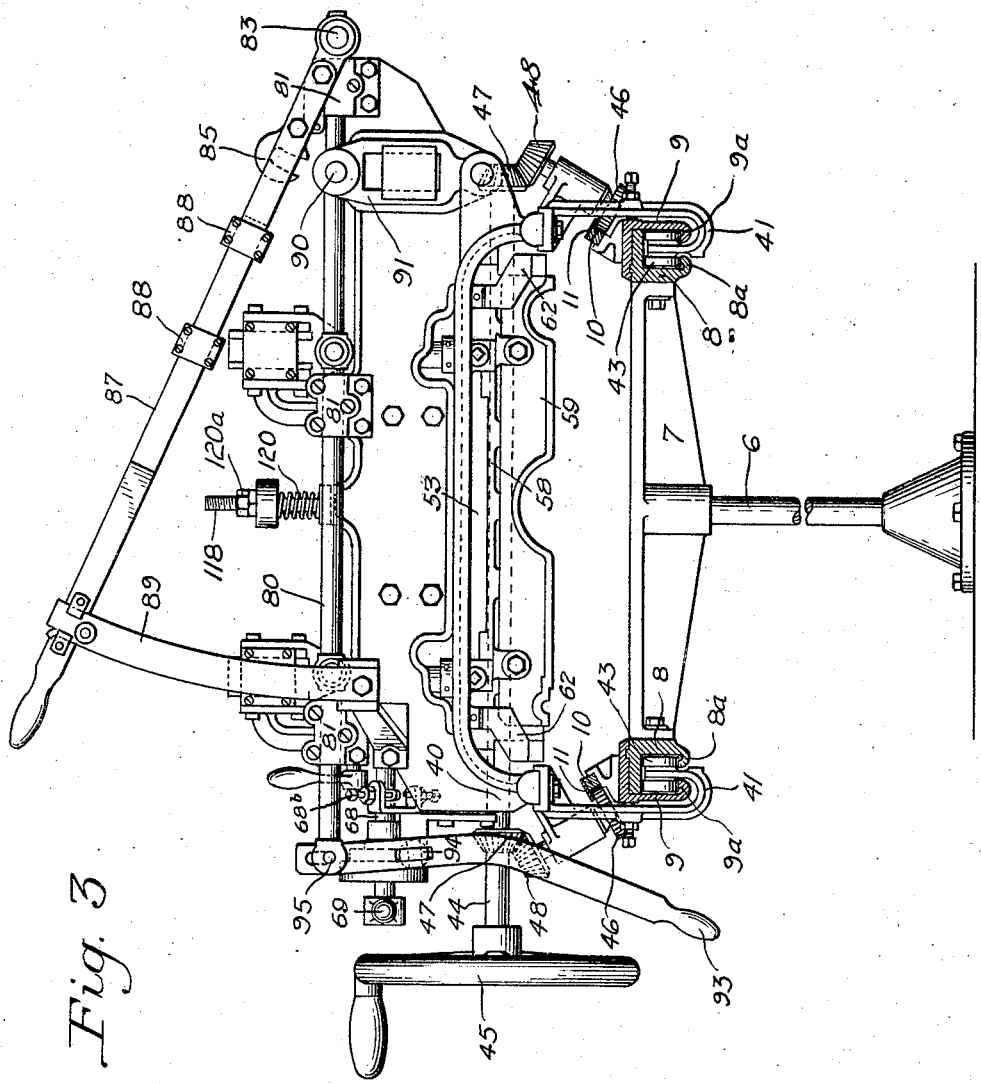
Figure 3 is a transverse section on the line III—III of Figure 1.
Figure 4:
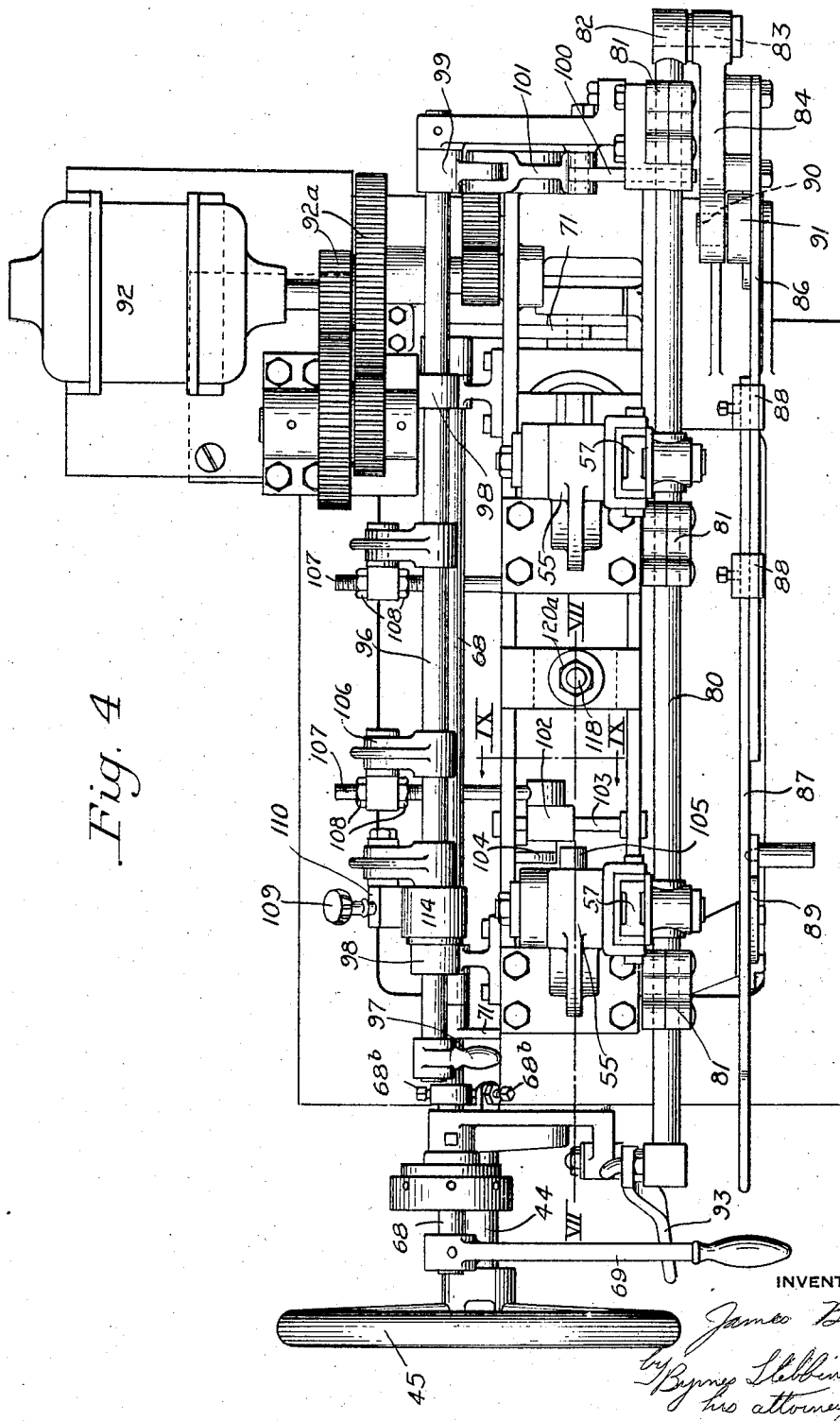
Figure 4 is a plan view of the forming head.

Cranks 57 are connected by a connecting rod 80, as shown in Figure 4. This rod is carried in suitable bearings 81 and has one end 82 pivotally connected at 83 with a link 84 having a hook 85 at its free end. Secured to this link is a reciprocable section 86 of a control lever 87, sections 86 and 87 being slidably connected at 88. Section 87 operates on a segment 89. When the lever is at the top of the segment, as shown in Figures 3 and 5, the hook 85 is out of driving connection with a pin 90 on an oscillating head 91 driven from a motor 92 on the carriage through gears 92ª. When the lever is lowered, the hook may engage pin 90, whereupon rod 80 will be reciprocated longitudinally to rapidly reciprocate the cross head and profile bar vertically through the toggle levers.

At 93 is a hand lever pivotally mounted on the carriage at 94. The upper end of this lever is slotted to releasably engage a pin 95 on the end of rod 80. With this lever, rod 80 can be reciprocated by hand to raise or lower the tamping bar. In order that the handle will not swing back and forth while rod 80 is being operated by power, the lever is disengaged from pin 95.

For the purpose of preventing rod 80 from being operated by power unintentionally, a rock shaft 96 is provided on the carriage having a hand lever 97 thereon. This shaft is carried in bearings 98 on the carriage and has a crank 99 on one end thereof pivotally connected with a transversely reciprocable locking pin 100 through link 101.

When pin 100 is projected, it extends under hooked link 84 and prevents this link and levers 86 and 87 from being lowered into driving relation with the pin 90. When it is retracted, it does not interfere with the operation of the lever.

The shaft 96 has a further function. When the profile bar is being used for troweling the block, after it has been tamped, the bar should be in its lowermost position. After pigment or finishing material has been spread over the block or slab, the profile bar should only be lowered to within a fraction of an inch of its lowermost position. If lowered too far, it would scrape off the pigment or surfacing, while if lowered to the proper distance it will spread the pigment or surfacing.

In order to gauge the proper limit for spreading surfacing or pigment, transversely sliding blocks are provided on the carriage 102, these blocks being slidable on bars 103. They carry lugs or wedges 104 having inclined surfaces. These wedges are adapted to ride under lugs 105 on the toggle levers 55. The blocks 103 are operably connected with cranks 106 on shaft 96 through links 107 so that as locking pin 100 is projected into operable position, wedges 104 are forced under lugs 105 to lift the profile bar an amount proportional to the inclination of the lugs and length of their travel. Nuts at 108 may provide an effective adjustment for the lugs. Set screws 109 on arms 110 on shaft 96, as shown in Figure 6, may contact with a part of the machine frame to limit the arcuate movement of shaft 96 and thereby provide an adjustment for the effective travel of lugs 104.

Since the power operation of the cross head is to be inoperative during the finishing of the block, it is fitting that locking the pin 100 and the limiting wedges or cams 104 be connected with a common operating element.

For the purpose of preventing operation of shaft 96 by vibration, the detent mechanism shown in Figures 13 to 16, inclusive, or any other suitable detent is used. The detent shown includes a fixed member 111 having teeth 112 on the face thereof. Secured to the shaft by pin 113, or other suitable means, is a cage 114 in which is one, and preferably three, spring projected detents 115, the springs therefor being designated 116. The arrangement is such that when one detent is engaged in a notch or tooth of the fixed disk 111, the other two detents bear against opposite faces of other teeth. One tooth is thus always fully engaged, while the other two detents tend to oppose each other, the teeth being relatively small.

For the purpose of providing a counter balance, the tamping bar carries a rod 118 whose upper end passes through a guide 119. About the upper end of the head is a compression spring 120 confined between guide 119 and nut and washer 120ᵃ on the rod.

In order to remove excess material from the pallet, and to effectively spread the material to the general contour of the profile bar, a scraper or striker bar 117, as shown in Figures 22 and 23, is braced against the front of the machine.

In operation, the carriage is moved to the position shown in Figure 1, while the cradle is dropped down, as shown in Figure 2. A relatively dry cement mix, with suitable reinforcements, if desired, is heaped onto the pallet, which is in its lowermost position. After making sure that sufficient material is in the pallet and the corners thereof are full, the hand wheel 45 is turned to feed the carriage over the pallet. At the same time the motor is operated to give the desired vertical tamping movement to the profile bar.

The striker bar 117 first spreads the material over the pallet and gives to the surface the configuration, more or less, of the top of the slab to be made. The reciprocating tamping or profile bar then passes over the material, packing it into the pallet, the hand wheel 45 being turned slowly enough and gradually enough that the tamping may be completed on a single pass of the machine.

The profile bar is then tilted so that its high edge is toward the direction of travel of the machine, this being done by rocking lever 69. Then the profile bar is lowered by operation of hand lever 93, the driving motor disconnected by operation of levers 86 and 87, and the carriage moved back over the slab. The profile bar then has a smoothing and troweling action. An inexperienced operator is enabled to quickly and easily tamp and trowel a slab with the machine, whereas it is slow and laborious work for a skilled workman to form a block by the old method.

After the slab has been formed, it is frequently desirable to color or surface the slab. This may be done by sprinkling pigment, such as dry red oxide of iron, and dry cement over the surface of the slab and spraying it with water. This coating is worked into the surface of the slab by lowering the profile bar as far as permitted by wedge 104 and lug 105, alternately tilting the profile bar and feeding the carriage in reverse directions over the slab. This work requires but a minute's time. If desired, the pigment may be initially applied in wet form.

The completed slab may then be elevated with its pallet in the manner hereinbefore described and removed, either by the cradle mechanism hereinbefore described, or in any other suitable manner and a new pallet set in the machine.

The formation of large roofing tiles or slabs may be easily accomplished in this machine, with relatively little labor and with a great saving of time over previous methods.

Various changes, modifications and departures from the specific construction shown are contemplated within the spirit of my invention.

I claim:

1. A machine for forming roofing tiles and the like, including a supporting frame, a pallet in the frame, a carriage movable over the pallet, a driving gear for the carriage, means on the carriage for tamping material in the pallet, and a driving mechanism for the tamping means, substantially as described.

2. A machine for forming roofing tiles and the like, including a supporting frame, a pallet in the frame, a carriage on the frame movable therealong over the pallet, and a tamping and troweling means on the carriage, said tamping and troweling means being reversely tiltable from a normal horizontal position, substantially as described.

3. A machine for forming roofing tiles and the like, including a support, a pallet receiving frame in the support, a carriage on the frame movable therealong over the pallet receiving frame, tamping means on the carriage, and means for raising and lowering the pallet receiving frame, substantially as described.

4. A machine for forming roofing tiles and the like, including a frame, a pallet received in the frame, a carriage movable along the frame over the pallet and fixed against relative vertical movement in the frame, means for effecting a movement of the carriage, a tamping bar in the carriage, and means for driving the tamping bar, substantially as described.

5. A machine for forming cement roofing tile and the like, including a frame, a pallet received in the frame, a carriage movable along the frame over the pallet, a tamping bar on the carriage, manually operable means for driving the carriage, and power operated means for actuating the tamping bar, substantially as described.

6. A machine for forming cement roofing tile and the like, including a frame, a pallet received in the frame, a carriage movable along the frame over the pallet, a tamping bar on the carriage, means for operating the carriage, a power driven actuting means for the tamping bar, means for disconnecting the tamping bar with its actuating means, and manually operable means for also operating the tamping bar, substantially as described.

7. A machine for forming cement roofing tile and the like, including a supporting frame, a pallet received in the frame, a carriage movable along the frame over the pallet, and a vertically movable profile bar in the carriage disposed crosswise of the carriage and which may be inclined transversely in opposite directions from a normal horizontal position for effecting a troweling action on material in the pallet, substantially as described.

8. A machine for forming cement roofing tile and the like, including a supporting frame, a pallet received in the frame, a carriage movable along the frame over the pallet, a vertically movable cross bar in the carriage and disposed crosswise thereof, and means for tilting the cross bar transversely of its length in either direction from a normal horizontal position, substantially as described.

9. A machine for forming cement roofing tile and the like, including a supporting frame, a pallet received in the frame, a carriage movable along the frame over the pallet, a vertically movable cross bar in the carriage and disposed crosswise thereof, means mounted on the carriage for tilting the cross bar transversely of its length, and other means on the carriage for imparting a vertically reciprocable motion to the profile bar, substantially as described.

10. A machine for forming cement roofing tile and the like, including a supporting frame, a pallet received in the frame, a carriage movable along the frame over the pallet, a vertically movable cross bar in the carriage and disposed crosswise thereof, means for tilting the cross bar transversely of its length, means for imparting a vertically reciprocable motion to the cross bar, other means for moving the cross bar up and down manually, and means for adjustably limiting the downward movement of the profile bar, substantially as described.

11. A machine for forming cement roofing tile and the like, including a supporting frame, a pallet received in the frame, a carriage movable along the frame over the pallet, a vertically movable cross bar in the carriage and disposed crosswise thereof, means for tilting the cross bar transversely of its length, a power drive for reciprocating the cross bar vertically, a hand operated means for reciprocating the cross bar, a releasable connection for the power drive for the cross bar, means operable for limiting the cross bar from traveling to its lowermost position, and a lock operable upon the setting of said limiting means to operable position for preventing the actuation of the releasable connection to driving position, substantially as described.

12. A machine for forming cement roofing tile and the like, including a supporting frame, a pallet received in the frame, a carriage movable along the frame over the pallet, a vertically movable cross bar in the carriage and disposed crosswise thereof, means for tilting the cross bar transversely of its length, a power drive for reciprocating the cross bar vertically, a hand operated means for reciprocating the cross bar, a releasable connection for the power drive for the cross bar, adjustable means operable for limiting the cross bar from traveling to its lowermost position, and a lock operable upon the setting of said limiting means to operable position for preventing actuation of the releasable connection to driving position, substantially as described.

13. In a machine of the class described, a supporting frame, a pallet receiving platform in the frame, means for raising and lowering the pallet receiving platform, a working head movable along the frame over the platform when the same is in lowered position, an inclined track on the frame, and a pallet receiving cradle movable along the track to receive a pallet from the receiving platform and carry it away, substantially as described.

14. In a machine of the class described, a supporting frame, a pallet receiving platform in the frame, means for raising and lowering the pallet receiving platform, a working head movable along the frame over the platform when the same is in lowered position, an inclined track on the frame, and a pallet receiving cradle movable along the track to receive a pallet from the receiving platform and carry it away, said track having a movable extremity which may be raised or lowered whereby the cradle may be dropped out of the path of the movable working head, substantially as described.

15. In a machine of the class described, a pallet support, a carriage movable over the support, and a profile bar in the carriage tiltable transversely in opposite directions from a normal position and operable for tamping or for troweling material in a pallet on the pallet support, substantially as described.

16. In a machine of the class described, a vertically movable pallet support, a pallet therein, a carriage movable over the pallet, and a reciprocable tamping bar in the carriage, substantially as described.

17. In a machine of the class described, a pallet support, a pallet therein, a carriage movable along the support over the pallet, and a vertically movable cross head in the carriage having a transversely reversely tiltable profile bar suspended therefrom, substantially as described.

18. In a machine of the class described, a pallet support, a pallet therein, a carriage movable along the support over the pallet, a vertically movable cross head in the carriage having a transversely tiltable profile bar suspended therefrom, means for tilting the profile bar, and means for frictionally holding the profile bar in the position in which it is set, substantially as described.

19. In a machine of the class described, a pallet support, a pallet therein, a carriage movable along the support over the pallet, a vertically movable cross head in the carriage having a transversely and reversely tiltable profile bar suspended therefrom, and an adjustable limiting means for limiting the tilting movement of the profile bar.

20. In a machine of the class described, a pallet support, a pallet therein, a carriage movable along the support over the pallet, a vertically movable cross head in the carriage having a profile bar suspended therefrom and tiltable transversely in opposite directions from a normal horizontal position, and means for adjustably limiting the tiltable movement of the profile bar in each direction from its normal position.

21. In a machine of the class described, a pallet receiving frame, a carriage on the frame, a protected trackway along each side of the frame which is enclosed at the top and sides to exclude dirt, rollers on the carriage engaging in the protected trackway for normally supporting the carriage, and a reciprocable tamping means on the carriage.

In testimony whereof I have hereunto set my hand.

JAMES BROWN.